No. 704,502. Patented July 15, 1902.
O. H. BOSSERT.
DRILL HOLDING CHUCK BOLT FOR ROCK DRILLS.
(Application filed Feb. 11, 1902.)
(No Model.)
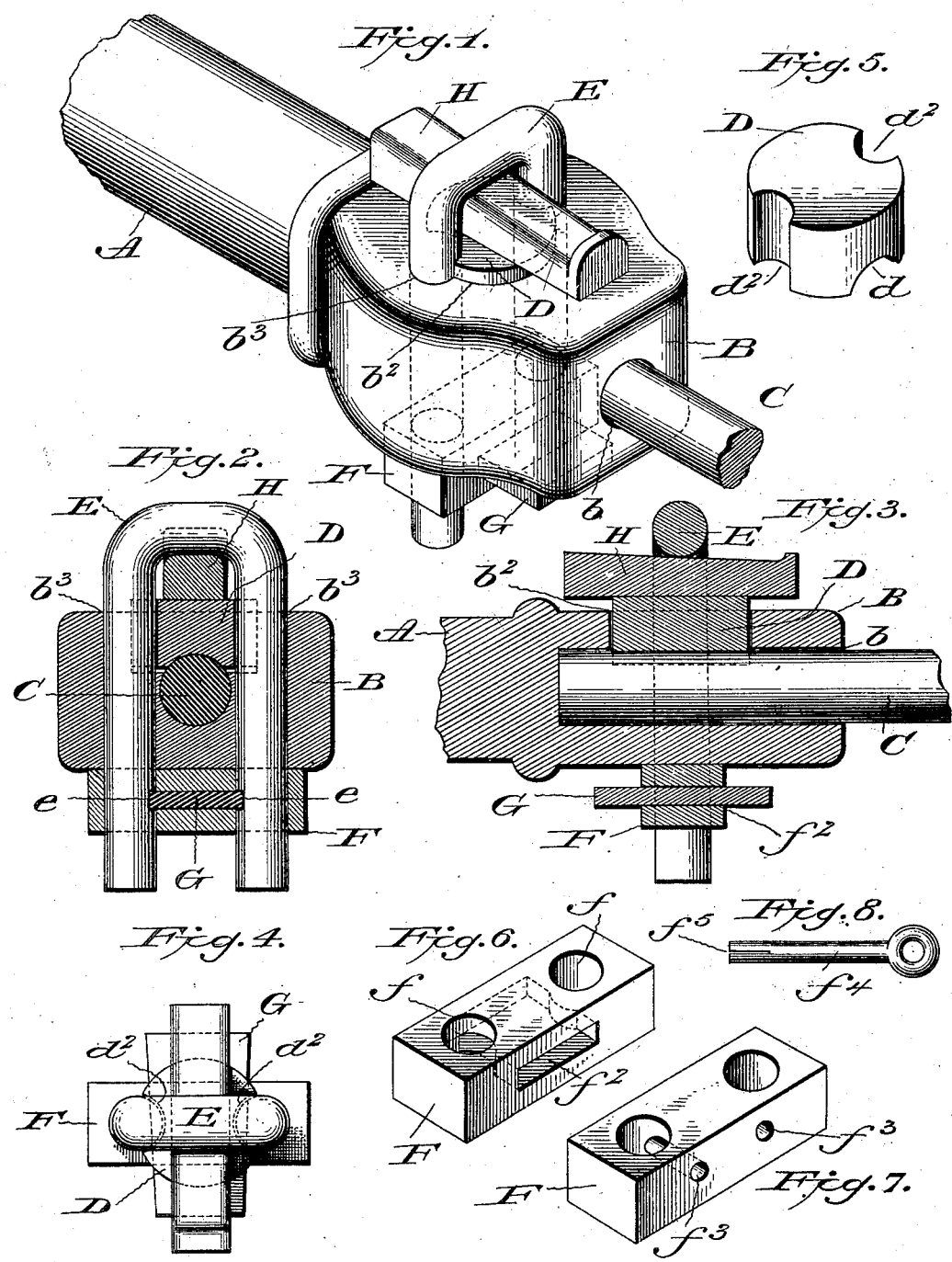
Witnesses:
G. Sargent Elliott.
Inventor:
Otto Henry Bossert
By H. S. Bailey, Attorney.

UNITED STATES PATENT OFFICE.

OTTO HENRY BOSSERT, OF DENVER, COLORADO.

DRILL-HOLDING CHUCK-BOLT FOR ROCK-DRILLS.

SPECIFICATION forming part of Letters Patent No. 704,502, dated July 15, 1902.

Application filed February 11, 1902. Serial No. 93,560. (No model.)

*To all whom it may concern:*

Be it known that I, OTTO HENRY BOSSERT, a citizen of the United States of America, residing at Denver, in the county of Arapahoe and State of Colorado, have invented certain new and useful Improvements in Chucks for Rock-Drills; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in drill-holding chuck-bolts for rock-drills.

The object of the invention is to provide means for rigidly clamping a drill within the chuck of a drill-bar in such a manner that the same may be quickly removed and replaced when desired, and to this end I dispense with the nuts which in general practice are secured upon the ends of the ordinary clamping or U bolt and employ a yoke provided with a pair of holes, through which the ends of the bolt pass, and a keyway, which passes through the yoke at right angles to the said bolt-holes in such a manner as to intersect them. A key is slid into the keyway, the sides of which engage notches in the bolt, and thus secure the yoke upon the said bolt, so that when a suitable wedge is driven between the top of the bolt and the ordinary clamping-block, which rests upon the end of the drill, the said drill will be rigidly secured within the chuck, and to remove the same it is only necessary to knock the wedge to one side by a blow from a hammer, when the drill may be removed, and when replaced a blow on the opposite end of the wedge will tightly clamp the said drill.

The invention further consists in certain novel features of construction, as will be set forth in the accompanying specification and claims.

In the accompanying drawings, Figure 1 is a perspective view of the chuck of a drill-shaft and showing the drill clamped therein by the employment of my improved device. Fig. 2 is a vertical transverse sectional view of the same at the point where the clamping-bolt passes through. Fig. 3 is a vertical longitudinal sectional view through the chuck and clamping device, fully illustrating the manner of clamping the drill. Fig. 4 is a plan view of the clamping device detached. Fig. 5 is a perspective view of the clamp-block. Fig. 6 is a perspective view of the yoke used in connection with my improved device. Fig. 7 is a view of a modification thereof. Fig. 8 is a view of a split pin used in connection with the said modified form of yoke.

Referring to the drawings, the letter A indicates the drill-bar, and B the chuck, which is integral therewith. The chuck is provided with the usual longitudinal bore $b$, in which the end of the drill lies, and on its upper side with the opening $b^2$, which communicates with the said longitudinal bore, as will be understood, and on either side of the opening $b^2$ are the usual bolt-holes $b^3$, through which the members of the U-bolt as commonly used are passed.

In common practice a drill is clamped in the chuck in the following manner: The rear end of the drill is placed in the bore $b$. A clamp-block is then placed in the opening $b^2$, so as to rest upon the end of the drill, and the U-bolt is passed through holes $b^3$, so as to straddle the clamp-block, and upon the threaded ends of the said bolt are screwed nuts by which the bolt is drawn upon the clamp-block, which is thus caused to tightly clamp the end of the drill and hold the same within the chuck. By the employment of my improved device the nuts are dispensed with, and the drill is clamped in the following manner: The rear end of a drill C is passed into the bore $b$ of the chuck B, and a clamp-block D is placed in the opening $b^2$, so that a semicircular groove $d$ in its under side will overlie the end of the drill. A specially-constructed U-bolt E is then passed down through the chuck, its members lying in vertical semicircular grooves $d^2$ on each side of the block D, as shown. Near the lower end of each member of the U-bolt and on the inner side thereof is a notch or recess $e$, the object of which will presently appear. A yoke F, having vertical holes $f$ and a keyway $f^2$ at right angles to the holes cut so as to intersect each hole on its inner side, is then slipped upon the ends of the bolt E, the said ends passing through the holes $f$, as shown, and when the keyway $f^2$ therein registers with the notches or recesses $e$ in the members of the bolt E a key G, which is slightly wider at one end than at the other, is passed through the said keyway $f^2$ and recesses $e$, thus securely locking the said yoke upon the lower end of the bolt. A wedge H is then placed between the top of block D and the connecting member of the bolt E and is driven forward, so as to tightly clamp the said block against the end of the drill, thus holding the same securely within the chuck. The point of wedge H and the narrow end of key G are both toward the forward end of the drill. Thus the jar from the stroke of the drill will serve to retain the said wedge and key in the positions to which they were driven when the drill was clamped.

By the employment of the herein-described device a drill can be quickly and firmly secured within the chuck of the drill-bar, and a blow from a hammer on the forward end of the wedge will unclamp the parts and allow said drill to be removed, while with the device now in general use a nut on each end of the bolt must first be unscrewed before the drill can be removed or tightly screwed up before the drill is securely clamped, and much time is thus consumed, for in drilling very hard rock the drills are so dulled and must be replaced by sharp ones, and while in the old form the nuts are apt to work loose from the constant jar upon them the same jar when my improved device is used serves to more tightly set the clamping-wedge.

In Fig. 7 I have shown a modification of the yoke F, in which the keyway $f^2$ is dispensed with and two holes $f^3$ are drilled horizontally through the yoke or at right angles to the holes $f$, each hole $f^3$ intersecting one of the holes $f$, as shown. The yoke is placed on the lower end of the bolt in such a position that the holes $f^3$ will be in line with the recesses $e$ in the bolt, when a pin $f^4$, having a split $f^5$ in its free end, is passed through each hole and recess, and the end of said pin is spread to prevent it from becoming detached from the yoke, and thus the yoke may be locked upon the bolt.

Having fully described my invention, what I claim as new, and desire to secure by Letters Patent, is—

1. In a drill-holder for rock-drills, the combination with a drill and drill-chuck, of a U-shaped bolt, the members of which pass through holes in the said chuck and are each provided with a notch or recess near their lower end; a yoke having holes through which the depending ends of the bolt are passed, and a keyway at right angles to the said holes, which intersects the same; a key which is passed through the keyway in said yoke and through the notch or recesses in the depending members of the bolt, so as to lock the said yoke upon the said bolt, and a wedge which lies between the connecting members of said U-shaped bolt and the top of the aforesaid clamp-block the said wedge being designed, when driven in one direction, to clamp the said block upon the aforesaid drill, so as to hold the same within the chuck, substantially as shown.

2. In a drill-holder, for rock-drills, the combination with a drill and drill-chuck, of a clamp-block which fits in a recess, in the said chuck, the said block being provided on its under side with a semicircular recess which overlies the end of the drill; a U-shaped bolt, which straddles the said block, the members thereof passing through the said chuck and each of said members being provided with a groove or recess near its lower end; a yoke having vertical holes and holes at right angles to the said vertical holes, which intersect the same, the said yoke being adapted to fit on the depending ends of the U-shaped bolt; pins which pass through the last-mentioned holes in the said yoke, and through the grooves or recesses in the ends of the said U-shaped bolt so as to lock the said yoke upon the said bolt, and a wedge which is driven between the connecting member of the U-shaped bolt and the top of the aforesaid clamping-block, so as to clamp the said block upon the end of the aforesaid drill, to retain the same within the said chuck, substantially as shown.

3. A clamping device for drills and the like, consisting of a U-shaped bolt, the members of which are each provided with a groove or recess near their lower end; a yoke, having holes through which the members of the bolt pass, and a keyway at right angles to said holes, which intersect the same; a key which is passed through the said keyway, and through the grooves or recesses in the members of the bolt, so as to lock the said yoke upon the said bolt a clamping-block, which lies upon the drill or a like object, and a wedge which is driven between the said block and the connecting member of the bolt, in combination with any suitable chuck or casing, substantially as shown.

In testimony whereof I affix my signature in presence of two witnesses.

OTTO HENRY BOSSERT.

Witnesses:
G. SARGENT ELLIOTT,
HIRAM W. CONGER.